US006823573B2

(12) United States Patent
Morrison et al.

(10) Patent No.: US 6,823,573 B2
(45) Date of Patent: Nov. 30, 2004

(54) SWAGING TOOL INCLUDING SYSTEM TO DETERMINE WHEN CONNECTOR IS IN A PROPER POSITION FOR ASSEMBLY

(75) Inventors: Philip R. Morrison, Mason, MI (US); William G. Thelen, Onondaga, MI (US); John P. Brittain, Mason, MI (US); Russell D. Bissinger, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/350,449

(22) Filed: Jan. 24, 2003

(65) Prior Publication Data

US 2003/0167614 A1 Sep. 11, 2003

(Under 37 CFR 1.47)

Related U.S. Application Data

(60) Provisional application No. 60/351,608, filed on Jan. 25, 2002.

(51) Int. Cl.[7] .................................................. B23P 19/04
(52) U.S. Cl. .............................. 29/237; 29/255; 29/252
(58) Field of Search .......................... 29/237, 252, 255, 29/282, 235; 72/453.02

(56) References Cited

U.S. PATENT DOCUMENTS

| | | | | | |
|---|---|---|---|---|---|
| 4,189,817 | A | * | 2/1980 | Moebius | 29/237 |
| 5,297,325 | A | * | 3/1994 | Thelen | 29/237 |
| 5,305,510 | A | * | 4/1994 | Croft et al. | 29/237 |
| 5,592,726 | A | * | 1/1997 | Suresh | 29/237 |
| 5,680,687 | A | * | 10/1997 | Hyatt et al. | 29/237 |
| 5,694,670 | A | * | 12/1997 | Hosseinian et al. | 29/237 |
| 6,430,792 | B1 | * | 8/2002 | Foster et al. | 29/237 |

* cited by examiner

*Primary Examiner*—Lee D. Wilson
(74) *Attorney, Agent, or Firm*—Honigman Miller Schwartz & Cohn, LLP

(57) ABSTRACT

A swaging tool for applying an assembly force on a fluid connector includes a tool main body, a first fluid connector holding section attached to the main body, a second fluid connector holding section attached to a piston, and a sensing system to determine when the fluid connector is in the proper position for assembly. The assembly tool applies an assembly force on the fluid connector when the fluid connector is in the proper position for assembly. In a preferred embodiment, the sensing system includes a fluid passage formed in the main body leading to a fluid port where the fluid port is positioned to be covered by the fluid connector when the fluid connector is in the proper position for assembly. The swaging tool applies an assembly force on the fluid connector when the fluid port is substantially covered by the fluid connector.

19 Claims, 3 Drawing Sheets

FIG 1
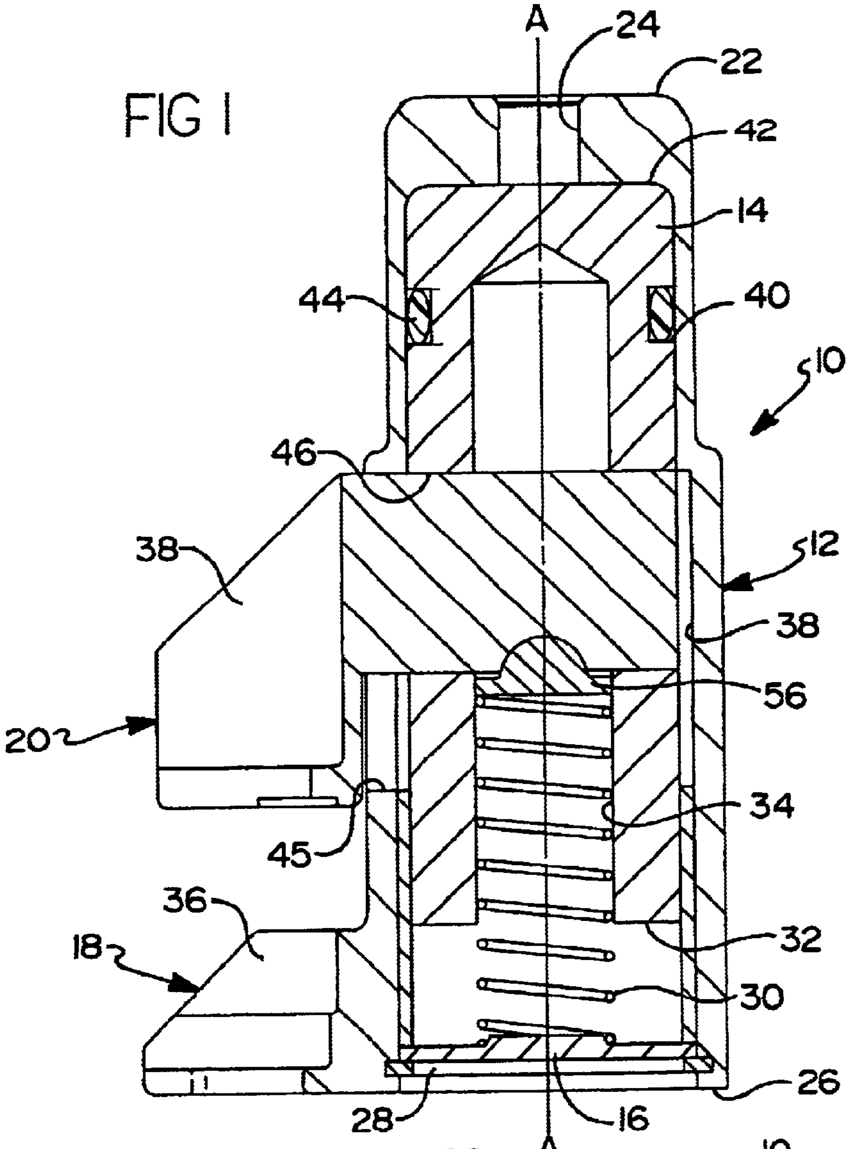
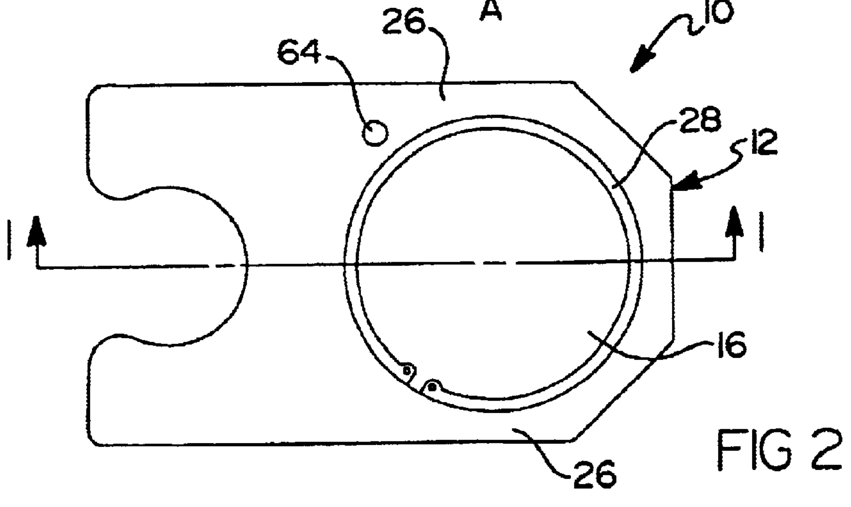
FIG 2

FIG 4
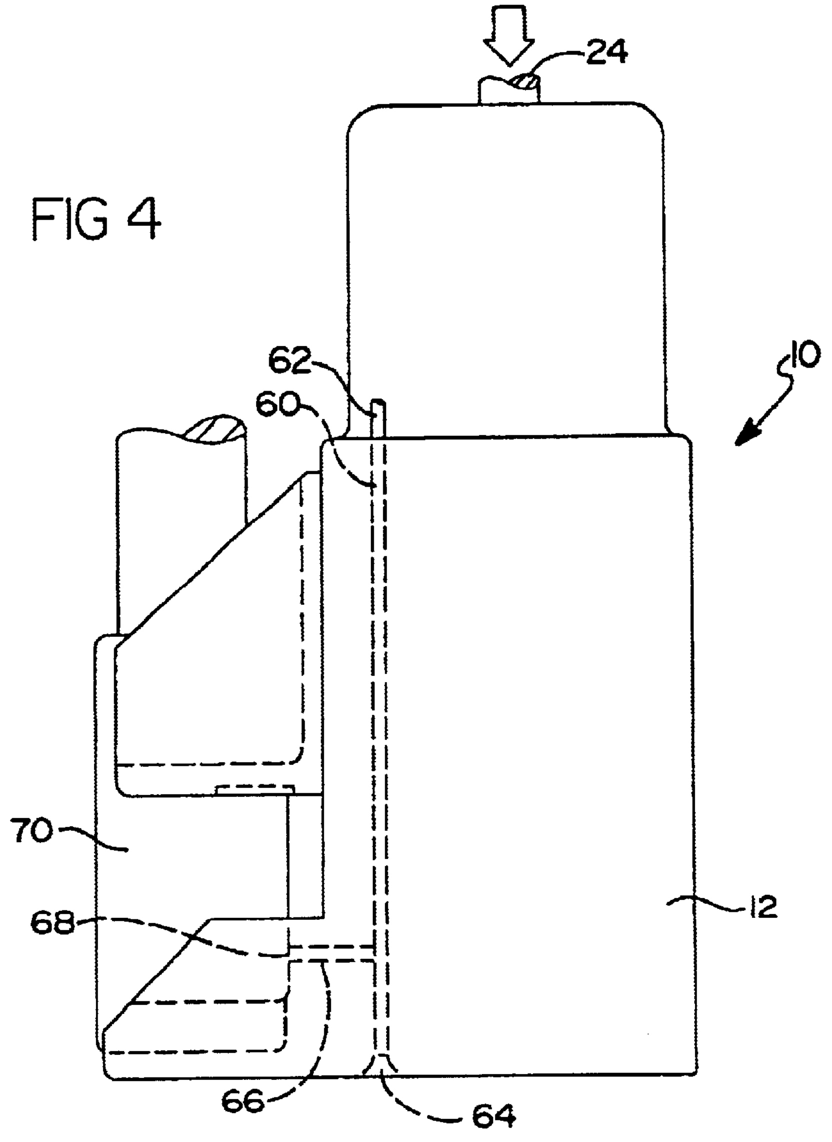
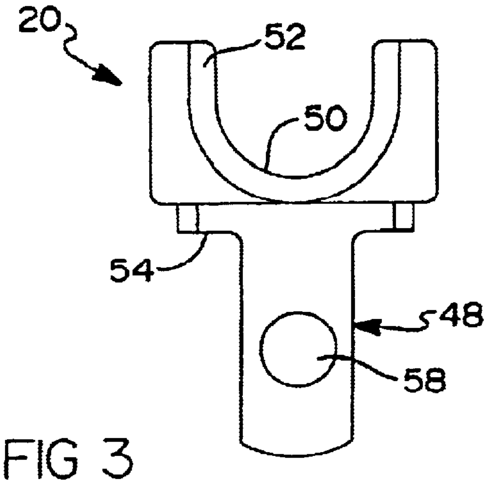
FIG 3

FIG 5
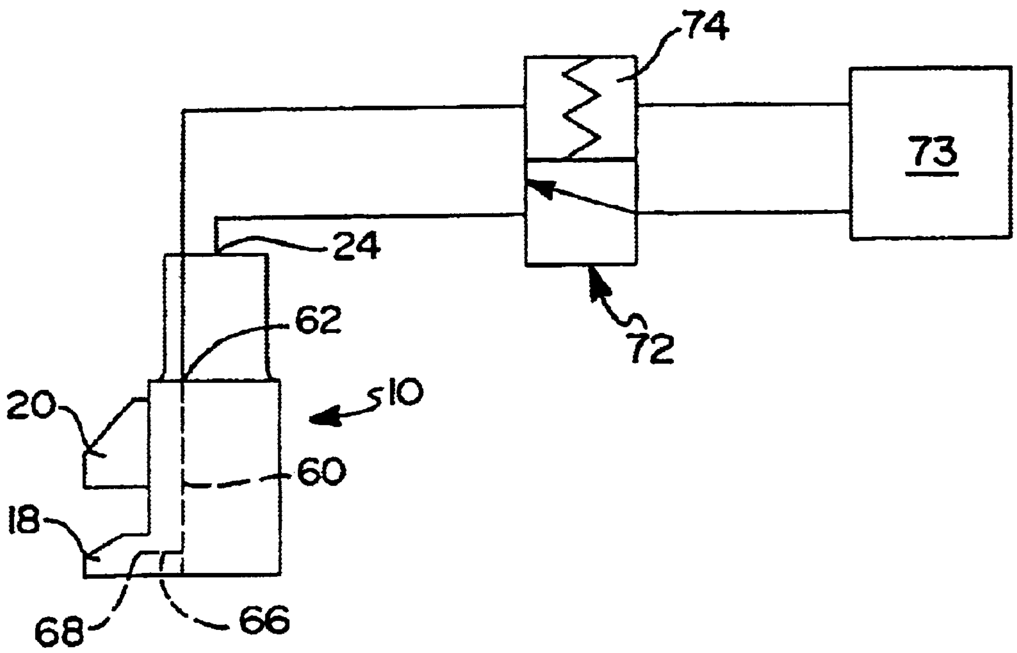
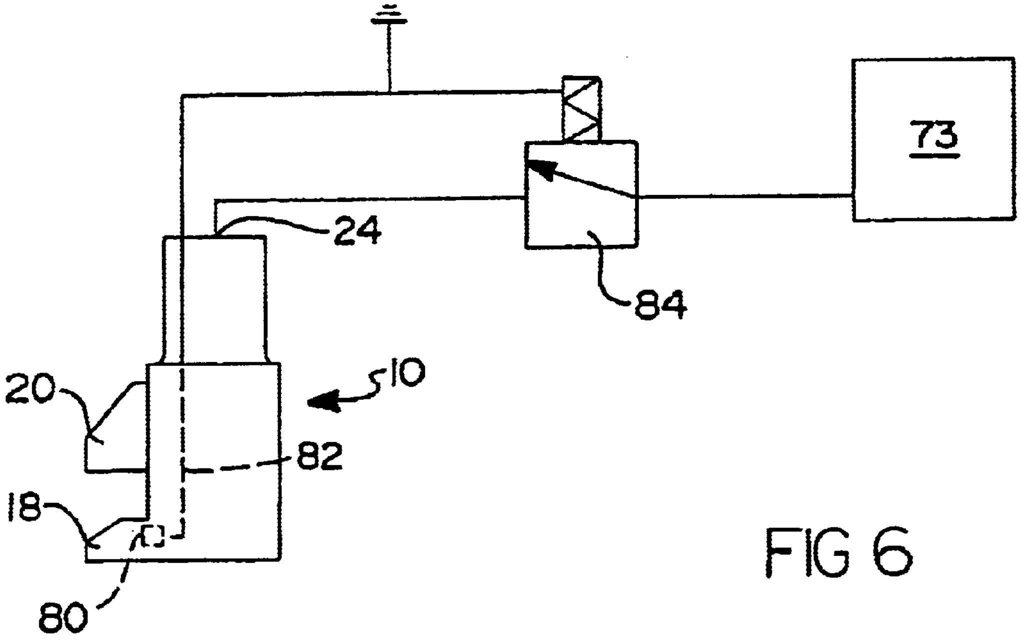
FIG 6

SWAGING TOOL INCLUDING SYSTEM TO DETERMINE WHEN CONNECTOR IS IN A PROPER POSITION FOR ASSEMBLY

CROSS REFERENCE TO RELATED APPLICATIONS

This application claims priority to U.S. provisional application No. 60/351,608 filed on Jan. 25, 2002, which is incorporated by reference in its entirety.

BACKGROUND OF THE INVENTION

1. Field of the Invention

The present invention relates to tools to assemble fluid connectors, such as swaging tools for swaging hydraulic fittings. More specifically, the present invention relates to a swaging tool that includes a system to determine when the fluid connector is in a proper position for assembly.

2. Description of the Related Art

Tools to assemble fluid connectors, such as swaged hydraulic fittings, have been used for many years to connect tubes and pipes in various types of fluid systems, including those used in the aircraft, marine, petroleum and chemical industries. In a typical swaging tool, a tube end is inserted into a fitting, usually in the form of a cylindrical sleeve, and then the fitting is swaged with a swaging tool to produce a fluid-tight connection around the tube. This swaging operation is usually carried out by applying a radial force that radially compresses the fitting and tubing inwardly. The radial force may be applied directly by the swaging tool or indirectly by a specially shaped ring that is moved axially by the swaging tool to apply a radial force to the fitting.

One type of swaging tool for axially swaged fittings includes a generally cylindrical housing having an inner surface and an outer surface, and a piston that is movable in opposite axial directions within the housing. The piston has a cylindrical outer surface in axial sliding engagement with the inner surface of the housing. The housing has a closed axial end and an open axial end where the open end encloses the piston within the housing. The open end is connected to a source of hydraulic pressure for selectively moving the piston axially within the housing. A first engaging member is formed on the outer surface of the housing adjacent to the closed end for engaging one of the rings or the sleeve of the fitting to restrain it from axial movement. A second engaging member is formed on the outer surface of the piston for engaging the other one of the ring or the sleeve to move it in an axial direction toward the first engaging member upon movement of the piston toward the closed end of the housing.

While the above-described swaging tool works quite well, it does have its limitations. In particular, proper positioning of a fitting in the first engaging member prior to swaging a metal tube or other type of fluid handling tube is critical to the integrity of the connection and to the longevity of the swaging tool. The limitations specifically minimized and/or eliminated by the present invention include the improper positioning of the fitting in the swaging tool during assembly.

SUMMARY OF THE INVENTION

According to the present invention, a swaging tool for applying an assembly force on a fluid connector is provided that includes a tool main body, a first fluid connector holding section attached to the main body, a second fluid connector holding section attached to a piston, and a sensing system to determine when the fluid connector is in the proper position for assembly. The assembly tool applies an assembly force on the fluid connector when the fluid connector is in the proper position for assembly.

In one embodiment, the sensing system includes a fluid passage formed in the main body leading to a fluid port that is positioned to be covered by the fluid connector when the fluid connector is in the proper position for assembly. The swaging tool applies an assembly force on the fluid connector when the fluid port is substantially covered by the fluid connector.

In another embodiment, the sensing system includes an electrically operable sensing means positioned to be activated by the fluid connector when the fluid connector is in the proper position for assembly. The swaging tool applies an assembly force on the fluid connector when the electrically operable sensing means is activated by the fluid connector.

BRIEF DESCRIPTION OF THE DRAWINGS

The features and inventive aspects of the present invention will become more apparent upon reading the following detailed description, claims, and drawings, of which the following is a brief description:

FIG. 1 is a cross-sectional view of a swaging tool according to a preferred embodiment of the present invention.

FIG. 2 is a bottom view of the swaging tool of FIG. 1.

FIG. 3 is an elevational view of the movable jaw shown in FIG. 1.

FIG. 4 is an elevational view of the swaging tool of FIG. 1 showing the relative position of the fluid passages.

FIG. 5 is a schematic illustration of the swaging tool and sensing system according to a preferred embodiment of the present invention.

FIG. 6 is a schematic illustration of the swaging tool and sensing system according to another embodiment of the present invention.

DESCRIPTION OF THE PREFERRED EMBODIMENTS

Referring now to the drawings, the preferred embodiments of the present invention are shown in detail. Referring to FIG. 1, there is shown an exemplary axial swaging tool 10 for swaging or otherwise assembling a fluid connector to a fluid conduit, such as a tube or pipe. Swaging tool 10 includes a housing or main body 12, a piston 14, an end cap 16, a fixed connector holding section or jaw 18, and a movable connector holding section or jaw 20 affixed to piston 14.

Housing 12 is generally tubular in shape, and includes a first end portion 22 that further includes a port 24 through which pressurized fluid may be introduced into the housing to force piston 14 in a direction away from port 24. End cap 16 is attached to housing 12 at a second housing end portion 26 by any conventional means, including screws, threads, pins and retaining rings. For example, in FIG. 1, a retaining ring 28 serves to hold end cap 16 in place. End cap 16 provides a backstop for a compression spring 30 interposed between housing second end 26 and a second or “dry” (i.e. not in contact with pressurized fluid) end 32 of piston 14 that serves to bias piston 14 toward housing first end 22. As shown in FIG. 1, piston dry end 32 may include a partial axial bore 34 along an axis A—A sized to accommodate and locate spring 30.

Jaws 18 and 20 are formed in accordance with accepted practice in the art, and may include gussets 36, 38, respectively, that limit deflection of the jaws when performing an assembly operation. Fixed jaw 18 is preferably attached to the exterior surface of housing 12 adjacent second end 26. If desired, fixed jaw 18 may be formed as part of removable end cap 16, thereby enabling fixed jaw 18 to be readily replaceable and interchangeable as desired. It should also be understood that end cap 16 may be replaced with a similar cap that includes a second port (not shown) for providing pressurized fluid to housing second end 26 to allow the tool 10 to be used in a reversible manner. However, for the purposes of the following description, the tool 10 will be described as if only one port 24 is available to provide pressurized fluid to move piston 14.

As shown in FIG. 1, piston 14 is defined in the disclosed embodiment as a single piece sized and shaped to fit within tubular housing 12 with small clearance therebetween. Piston 14 is axially movable within housing 12 along axis A—A, which is typically coaxial with the housing's cylindrical inner surface 38, in response to force provided by either spring 30 or pressurized fluid introduced through port 24. Piston 14 may also be provided with a radial groove 40 adjacent piston first or "wet" (i.e. in contact with pressurized fluid) end 42 to allow location of a radial seal 44 to prevent blow-by of pressurized fluid between piston 14 and housing cylindrical inner surface 38 or to provide a bearing surface for slideable movement of piston 14, or both. Of course, if a second port were provided at housing second end 26, then a similar groove and seal arrangement would be provided in the piston adjacent the dry end 32.

Piston 14 may also formed so that movable jaw 20 is readily insertable, removable and/or replaceable, as illustrated in FIG. 1. To accommodate insertion and removal of movable jaw 20, housing 12 includes an axially extending aperture 45 of sufficient length to allow axial movement of jaw 20 in response to movement of piston 14.

In order to secure jaw 20 to piston 14, piston 14 is formed with an axial bore 46. As best shown in FIG. 3, movable jaw 20 is defined by a generally Y-shaped body having a base leg 48, sized and shaped to be received within axial bore 46, and an upper fitting seat 50. Seat 50 is conventionally sized and shaped to receive a fluid connector to be swaged, and may include gussets 52, while base leg 48 may be formed into any cross-sectional shape, such as the rectangular shape shown in FIG. 3. Of course, the cross-sectional shape and size of axial bore 46 should correspond to the cross-sectional shape and size of leg 48, since leg 48 is designed to be received within axial bore 46 such that an underside 54 of seat 50 contacts piston 14.

Compression spring 30 is also used to apply an axial force against base leg 48 to assist in retaining movable jaw 20 in place. To apply the axial force, spring 30 may terminate in a detent 56 that is axially biased by the spring and is received in a corresponding recess 58 formed in the base leg 48. Detent 56 is axially biased by spring 30 into frictional contact with base leg 48. The biasing force may be increased as a function of the strength of spring 30, and may also be increased by contouring the interface between detent 56 and recess 58. As seen in FIG. 1, recess 58 and detent 56 are preferably hemi-spherically shaped, but any shape may be used to achieve the desired interlocking.

During assembly of a fluid connector, fluid pressure introduced into port 24 applies a force against piston 14. Piston 14 then applies a radial force, through jaw 20 to the fluid connector. Jaws 18 and 20 cooperate to radially compress the fluid connector and tubing inwardly. As is known in the art, the radial force may be applied directly by swaging tool 10 or indirectly by a specially shaped ring that is moved axially by swaging tool 10 to apply a radial force to the fitting.

Swaging tool 10 also includes a sensing system to determine if the fluid connector is in the proper position for assembly. Referring to FIGS. 2 and 4, main body 12 includes a first fluid passage 60 (shown using hidden lines) that extends axially from a first port 62 to a second port 64. Second port 64 is capped or otherwise sealed, while first port 62 is provided in communication with a source of fluid pressure, such as a hydraulic pump or air compressor. Alternatively, first port 62 may be capped and second port 64 may open to receipt of fluid pressure, or main body 12 may include only one of first and second ports 62, 64.

A second fluid passage 66 is provided in communication with first fluid passage 60 and leads to a third fluid port 68 that is positioned to be covered by a fluid connector, depicted generically as element 70, when placed in the proper position in jaw 18 for assembly. Third fluid port 68 is open to allow the pressurized fluid to exit freely therefrom when fluid connector 70 is not in position for assembly.

Referring to the schematic illustration provided in FIG. 5, the fluid pressure in first and second passages 60, 66 is used to control the flow of pressurized fluid to swaging tool 10 by using a control valve 72 having a pilot section 74. Passages 60, 66 are provided in communication with a source of fluid pressure 73 via the pilot section 74 of control valve 72. Although not illustrated, a separate control valve may be placed between control valve 72 and pressure source 73 to initiate the assembly operation. After initiation of the assembly operation and when the pressure in passages 60, 66 reaches a pre-set value (i.e. the regulated or pilot pressure), the pilot section 74 actuates control valve 72 in a known manner, which allows pressurized fluid from fluid source 73 to reach piston 14 through port 24.

During operation of swaging tool 10, a regulated supply of fluid pressure is routed through first and second passages 60, 66 to third port 68, such that fluid connector 70, when properly positioned in jaw 18 for crimping, substantially closes off third port 68, thereby increasing the pressure within first and second passages 60, 66. In the best case, fluid connector 70 completely covers third port 68, causing the fluid pressure in passages 60, 66 to quickly increase to the regulated or pilot pressure. However, third port 68 need not be completely covered for the pressure in passages 60, 66 to increase to the pilot pressure. Rather, the pilot pressure may be pre-selected so that leakage of pressurized fluid from third fluid port 68 due to slight misalignment of fluid connector 70 in jaw 18 will also cause actuation of control valve 72.

Therefore, when connector 70 substantially closes off third port 68, the pressure will rise to the regulated or pilot pressure, while when third port 68 is open, such as when fluid connector 70 is out of position, the pressure in first and second fluid passages 60, 66 will be lower than the regulated or pilot pressure. Unless the pressure in first and second fluid passages 60, 66 approaches or equals the regulated or pilot pressure, control valve 72 will remain closed and no fluid pressure will be supplied to piston 14. In this manner, swaging tool 10 does not apply an assembly force unless connector 70 is in its proper position for assembly.

In another embodiment of the present invention, illustrated schematically in FIG. 6, third port 68 is replaced with an electrically operable sensing means 80, such as, for example, a proximity sensor, a magnetic sensor, a laser sensor or an electromechanical switch. Passages 60, 66 are replaced with a means of communicating with an electrically operable valve 84, such as a wire 82 or a radio communication device. Electrically operable valve 84 can be opened to allow passage of pressurized fluid in response to a signal received from sensing means 80. When fluid connector 70 is properly placed in jaw 18 for assembly, sensing means 80 is activated and provides a signal to valve 84.

For example, placing fluid connector 70 in jaw 18 physically actuates an electromechanical switch that sends a signal to valve 84. The signal causes valve 84 to open and allow passage of pressurized fluid from fluid source 73 into swaging tool 10. In this manner, swaging tool 10 does not apply an assembly force to fluid connector 70 unless fluid connector 70 is in its proper position to activate sensing means 80.

It will be appreciated that more than one electrically operable sensing means 80 may be used to determine if fluid connector 70 is in the proper position for assembly. Additionally, the signal provided by electrically operable sensing means 80 in response to the position of fluid connector 70 may also be used to activate a pump used to provide fluid pressure to piston 14. Also, the absence or presence of a signal from sensing means 80 may be used to activate an alarm that warns an operator of swaging tool 10 that fluid connector 70 is not in the correct position for assembly.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A swaging tool for applying an assembly force on a fluid connector comprising:

a tool main body;

a piston moveable within the main body;

a first fluid connector holding section attached to the main body and a second fluid connector holding section attached to the piston, said first and second fluid connector holding sections cooperating to apply an assembly force on the fluid connector;

a sensing system to determine when the fluid connector is in the proper position for assembly; and wherein the swaging tool applies the assembly force on the fluid connector when the fluid connector is in the proper position for assembly.

2. The swaging tool of claim 1, wherein the sensing system includes a fluid passage formed in the main body leading to a port.

3. The swaging tool of claim 2, wherein the port is positioned to be covered by the fluid connector when the fluid connector is in the proper position for assembly.

4. The swaging tool of claim 2, wherein the assembly force is applied on the fluid connector when the port is substantially covered by the fluid connector.

5. The swaging tool of claim 2, wherein the fluid passage and the piston are provided in communication with a source of pressurized fluid.

6. The swaging tool of claim 5, wherein the sensing system further includes a control valve that selectively provides the piston in communication with the source of pressurized fluid when the pressure in the fluid passage reaches a predetermined pressure.

7. The swaging tool of claim 6, wherein the pressure in the fluid passage reaches the predetermined pressure when the fluid connector is in the proper position and the port is substantially covered.

8. The swaging tool of claim 7, wherein it is the fluid connector that substantially covers the port.

9. The swaging tool of claim 1, wherein the sensing system includes a sensor for determining the position of the fluid connector.

10. The swaging tool of claim 9, wherein the assembly force is applied on the fluid connector when the sensor determines the fluid connector is in the proper position for assembly.

11. The swaging tool of claim 9, wherein the sensing system further includes a control valve that selectively provides the piston in communication with a source of pressurized fluid when the fluid connector is in the proper position for assembly.

12. The swaging tool of claim 1, wherein the sensing system includes a switch positioned to be actuated by the fluid connector when the fluid connector is in the proper position for assembly.

13. The swaging tool of claim 12, wherein the assembly tool applies an assembly force on the fluid connector when the switch is actuated by the fluid connector.

14. The swaging tool of claim 12, wherein the sensing system further includes a control valve that selectively provides the piston in communication with a source of pressurized fluid when the fluid connector is in the proper position for assembly.

15. A swaging tool for applying an assembly force on a fluid connector comprising:

a tool main body;

a piston moveable within the main body;

a first fluid connector holding section attached to the main body and a second fluid connector holding section attached to the piston, said first and second fluid connector holding sections cooperating to apply an assembly force on the fluid connector;

a fluid passage formed in said main body leading to a fluid port where said fluid port is positioned to be covered by the fluid connector when the fluid connector is in a proper position for assembly; and wherein the swaging tool applies the assembly force on the fluid connector when said fluid port is substantially covered by the fluid connector.

16. A swaging tool for applying an assembly force on a fluid connector comprising:

a tool main body;

a piston moveable within the main body;

a first fluid connector holding section attached to the main body and a second fluid connector holding section attached to the piston, said first and second fluid connector holding sections cooperating to apply an assembly force on the fluid connector;

an electrically operable sensing means positioned to be activated by the fluid connector when the fluid connector is in a proper position for assembly; and wherein the swaging tool applies the assembly force on the fluid connector when said electrically operable sensing means is activated by the fluid connector.

17. The swaging tool of claim 16, wherein the electrically operable sensing means includes a sensor for determining the position of the fluid connector.

18. The swaging tool of claim 17, wherein the sensor is one of a proximity sensor, a magnetic sensor and a laser sensor.

19. The swaging tool of claim 16, wherein the electrically operable sensing means includes a switch positioned to be actuated by the fluid connector when the fluid connector is in the proper position for assembly.

* * * * *